June 5, 1956 E. A. ROGGE ET AL Re. 24,161
DOCTOR BLADE AND MOUNTING FOR ROTOGRAVURE PRINTING MACHINES
Original Filed Aug. 24, 1953
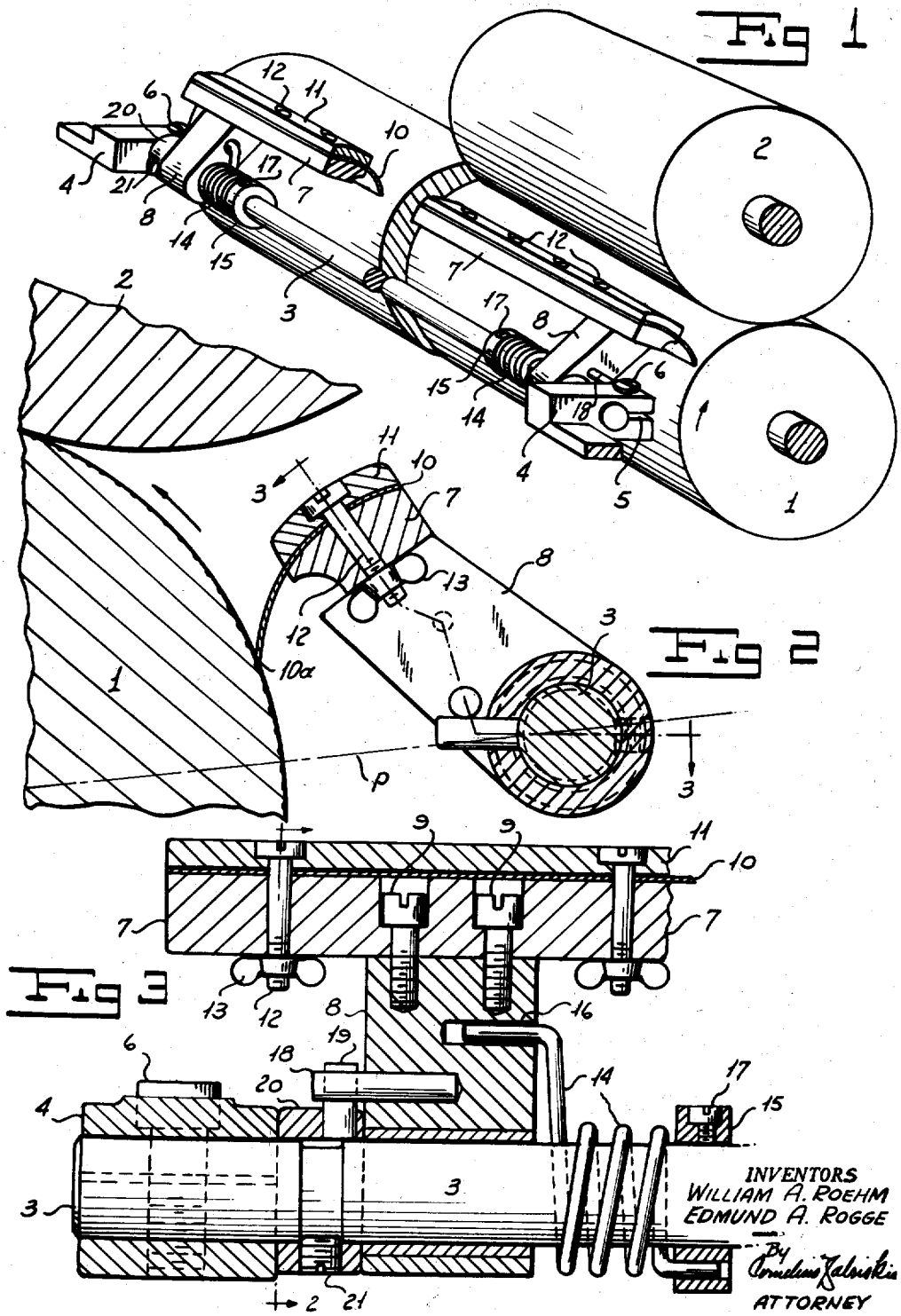
INVENTORS
WILLIAM A. ROEHM
EDMUND A. ROGGE
By Cornelius Zalewski
ATTORNEY United States Patent Office Re. 24,161
Reissued June 5, 1956

24,161

DOCTOR BLADE AND MOUNTING FOR ROTOGRAVURE PRINTING MACHINES

Edmund A. Rogge, Jackson Heights, and William A. Roehm, Rockville Centre, N. Y.

Original No. 2,704,026, dated March 15, 1955, Serial No. 376,046, August 24, 1953. Application for reissue February 27, 1956, Serial No. 568,144

5 Claims. (Cl. 101—157)

Matter enclosed in heavy brackets [ ] appears in the original patent but forms no part of this reissue specification; matter printed in italics indicates the additions made by reissue.

This invention relates to rotogravure or intaglio printing and is directed more particularly to a novel doctor blade and mounting therefor.

Rotogravure web printing, ever since its inception, has had difficulty with "streaking" and similar defects in the impression on the web. Streaking, in particular, has constituted a major problem in this industry that has never been satisfactorily overcome. It is generally manifested by false printing impressions in the form of lines entirely foreign to the intaglio recesses of the printing cylinder.

This phenomenon of streaking has been attributed to a wide variety of causes, the most common of which is the presence of extraneous matter which may be in the ink when received from the supplier or which accumulates in the ink during a printing run. For example, lint from the raw web stock printed upon, hardened ink particles, as well as metal particles which may be freed from the doctor blade or from the copper or chromium plating of the cylinder, are carried along with the ink to the doctor blade and, as the surplus ink is wiped from the cylinder, these particles cause scratches in the cylinder, nick the blade or produce uneven wiping of the cylinder surface. Various expedients have been resorted to in an attempt to free the ink from these impurities and foreign matter prior to its passage to the doctor blade. Screens, magnetic devices, and other expedients have been employed in this connection and while streaking has been lessened, it has not been eliminated by any means and continues to be the source of much annoyance and expense in the industry.

During many years of experience with gravure printing, we have studied the phenomenon of streaking and cylinder wear and we have concluded that one of the factors which causes the same is inherent in the present practice of removing the surplus ink from the cylinder through the wiping action of the doctor blade upon the cylinder. As invariably constructed, rotogravure machines are so constituted that the doctor blade bears against the surface of the cylinder in an inclined direction, wherein the cylinder contacting edge of the blade faces in the direction of rotation of the cylinder. The body of the blade back of its wiping edge is thus arranged at an acute angle to the surface of the cylinder and forms therewith a tapering recess which the ink upon the cylinder enters in advance of the wiping edge.

As a result of this arrangement, the ink is literally squeezed, in an uncontrolled manner, from the surface of the cylinder, out of the angular recess below the wiping edge and laterally beyond the ends of the doctor blade. Experience has convinced us that extraneous matter in the ink, particularly hard particles, such as metallic particles, cannot be effectually squeezed in a retrograde direction. On the contrary, they become wedged in the sharp angle between the blade and the cylinder, with the result that in some cases they act as minute cutters which score the cooper and/or chromium surface of the cylinder or, if they become embedded in the copper surface of the cylinder, because of the pressure of the blade, they not infrequently produce nicks in the blade edge. In either case, ink, other than that contained in the intaglio recesses of the cylinder, passes the blade and produces false impressions of streaking on the printed web. Softer foreign matter accumulating back of the blade may result in "fogging" or other similar phenomena.

As a result of protracted research, experimentation and tests, we have found that many of the causes of streaking may be entirely eliminated through a radical departure from prior practice in the removal of excess ink from the cylinder by the doctor blade. We have been able to accomplish this result by entirely changing the relation between the doctor blade and the cylinder. Whereas the doctor blade has heretofore invariably been inclined in the direction of rotation of the cylinder, the present invention reverses this relation and so mounts the doctor blade that its cylinder contacting edge faces in a direction contrary to the direction of rotation of the cylinder. Thus while prior practice was such that the doctor blade had a wiping action on the cylinder surface, the doctor blade of the present invention has a shearing action with respect to the ink on said surface. In other words, the angle of approach of the doctor blade to the surface of the cylinder is contra to the direction of rotation of the cylinder.

As a result, the ink is actually cut or sheared from the surface of the cylinder in such manner that there is no entrapment of extraneous matter which may be contained in the ink and no pressing of such extraneous matter against the surface of the cylinder as heretofore. In contradistinction, the surplus ink and all impurities therein are freed from the surface of the cylinder by a shearing edge which enters beneath these particles and the surplus ink and actually lifts them free from the surface of the cylinder, so that they are guided away or flow back into the fountain, leaving the intaglio recesses of the cylinder properly charged with the ink which it is desired to subsequently deposit upon the web.

Furthermore, with the blade of this invention, the surplus ink is guided away from the surface of the cylinder by a curved blade which does not appreciably change its direction of movement. This ink follows the curvature of the blade and is freed from the said surface without placing said ink under compression as heretofore. Consequently "ink slinging" (the squirting of the ink laterally beyond the ends of the blade), so common to prior practice is entirely eliminated through the use of our blade.

Experience with this invention has shown that the best results are obtained when the blade is made relatively thin and of resilient material, such as spring steel and when the blade is placed under transverse stress. A thin resilient blade thus stressed will automatically adapt its shearing edge to the surface of the cylinder and, as it is reciprocated axially of the cylinder, as is common, the contact which it makes with the cylinder will be uniform throughout and the shearing action to which we have referred will result. Furthermore, through the use of a relatively light, thin and resilient doctor blade, we have found that the pressure of its shearing edge may be much less than is required under prior practice. Consequently both the blade and the cylinder are subjected to less wear and consequently will last longer than former gravure printing assemblies. Moreover, when a stiff blade is used, as heretofore, it must be pressed very tightly against the cylinder and there is the ever present tendency thereof to crush the side walls of the intaglio recesses. That cannot occur with the thin blade of this invention, functioning in the manner stated.

Features of the invention, other than those adverted to, will be apparent from the hereinafter detailed description and appended claims, when read in conjunction with the accompanying drawing.

The accompanying drawing illustrates one practical embodiment of the invention, but the construction therein shown is to be understood as illustrative, only, and not as defining the limits of the invention.

Fig. 1 is a fragmental perspective showing portions of a cylinder, an impression roll, and a doctor blade assembly embodying the present invention.

Fig. 2 is a transverse vertical section taken in the plane of the line 2—2 of Fig. 3, Fig. 2 being on a somewhat enlarged scale.

Fig. 3 is a fragmentary section on the broken line 3—3 of Fig. 2.

In the showing of the drawings, 1 designates the conventional cylinder and 2 a cooperating impression roll. A shaft 3 extends longitudinally of the cylinder and is supported at its opposite ends in clamps 4 forming part of the apparatus which supports the doctor blade and longitudinally reciprocates the latter during the operation of the machine. The opposite ends of the shaft 3 are fitted into circular holes in the clamps 4 and these clamps are split as shown at 5. Screws 6 serve to tighten the clamps so that they will grip the shaft 3 and lock it against rotation. When the screws 6 are loosened, the shaft may be rotated slightly for the purpose of adjustment of the parts, as will be hereinafter more fully described. The blade holder 7 is in the form of an elongated bar extending parallel to the axis of the cylinder and provided near its opposite ends with brackets 8 fixed to the bar by screws 9, as shown best in Fig. 3. These brackets extend to and are perforated to receive the shaft 3 on which the brackets are pivotally mounted, being provided with bushings as shown in said figure.

The upper surface of the blade holder 7 is of arcuate cross section to conform to a portion of the width of a correspondingly shaped doctor blade 10. This blade is firmly clamped to the holder by a clamping strip 11, normally held in place by spaced apart bolts 12 passing through alined perforations in the strip, blade and holder and having wing nuts 13 for convenience of manipulation.

The blade is formed from relatively thin resilient material, such as spring steel, so as to have both longitudinal and transverse resiliency. It is formed with the arcuate cross section referred to. Its thickness may vary in accordance with the size of the machine in which it is to be used, although an optimum thickness for medium size machines is usually between 5 and 10 thousandths of an inch. A blade of this thickness will possess the requisite strength and at the same time the desired resiliency. A backing blade may be associated therewith or the clamping strip may be extended to function as a backing blade although this is not essential to the proper operation of our invention.

The blade is forced against the surface of the cylinder by means of springs 14, one of which is associated with each bracket 8. Each spring is coiled about the shaft 3 with one end of the spring extending into a hole in an adjustable collar 15 on the shaft 3, while the other end of the spring extends into a hole 16 in the corresponding bracket 8. These springs so bias the holder as to impel the free edge of the doctor blade against the surface of the cylinder 1. The force thus exerted by the springs may be regulated by turning the collars 15 on the shaft 3, while set screws 17 are loose, and then tightening said set screws when the desired pressure of the blade against the cylinder has been obtained.

In any event that pressure should be sufficient to hold the blade firmly against the cylinder and the curvature of the blade is preferably such that it will approach tangency to the surface of the cylinder but not be exactly tangent. Fig. 2 shows a very satisfactory relationship for most installations.

To insure proper relation between the blade and the cylinder, each of the brackets 8 is provided with a stop pin 18 (Fig. 3) adapted to cooperate with a limiting pin 19 carried by an adjustable collar 20 on the shaft 3. This collar may be circumferentially adjusted by rotating it on the shaft and locking it in adjusting position by a set screw 21. By this means, the position of the blade holder will be accurately regulated to yield the best performance.

It is to be noted that, when the blade is set up as shown in the drawings, its free end 10*a* will face in a direction contra to the direction of rotation of the cylinder. In any event, it will exert a shearing action upon the ink carried by the cylinder during the operative rotation of the latter and experience has shown that it will longitudinally adapt itself to the cylinder surface and produce substantially uniform pressure throughout its length. Instead of wiping the ink from the surface as has heretofore been the practice, the blade of this invention will actually shear it from the surface and this shearing action will be facilitated by the normal longitudinal reciprocatory movement of the blade. Consequently there will be no entrapment of extraneous matter which may be carried by the cylinder into engagement with the blade. There is no acute angle nor reentrant recess in which hard or soft particles or dirt can lodge. The ink and its impurities will be sheared cleanly from the surface of the cylinder leaving in such surface only such ink as is contained in the intaglio recesses of the etched cylinder. As the surplus ink is sheared or shaved from the drum, it will flow back along the surface of the drum or follow the under surface of the blade to the blade holder and from there gravitate into the fountain.

Contact between the blade and the cylinder will maintain the free edge of the blade sharp because of the blade honing action between these parts and said edge of the blade will conform to the surface of the cylinder so that a highly satisfactory knife edge for shearing purposes will result.

The springs 14, which hold the blade in cooperative relation with the cylinder, have several advantages. For example, should it be desired at any time to stone the edge of the blade, these springs will permit the blade holder, with the blade attached, to be moved away from the cylinder in a clockwise direction, as the parts appear in Fig. 2, so that the blade can be stoned without removing it from its holder or without destroying the adjustment of the parts. Furthermore, should the blade engage with extraneous matter on the cylinder which the blade is not able to properly shear therefrom, the springs 14 will permit retraction of the blade under the force applied thereto by such matter without damage to the blade. Also, when a press is stopped for any reason and the stoppage is of sufficient duration to permit drying of the ink on the cylinder in advance of the blade, this ink becomes hard and extremely difficult to remove. If the press is subsequently started, the force required to remove the dried ink would tend to buckle the blade and damage the cylinder. Should such a condition exist, the springs permit retraction of the blade as stated without harm to either the blade or to the cylinder.

As shown in the drawing, the line of contact between the edge of the blade and the cylinder is spaced from and back of the plane, indicated at p, which includes the axis of rotation of the cylinder and the axis of the shaft 3. In other words, this plane is in advance of the line of contact between the blade and the cylinder. When these conditions exist, the engagement of the blade with any hard obstruction on the surface of the cylinder which the blade is unable to readily shear off, will cause the blade to travel with the obstruction and be automatically retracted or backed away from the cylinder against the tension of the springs which normally maintain it in engagement with said surface and so permit the obstruction to pass without damage to either the blade or the surface of the cylinder.

Another advantage of using a resilient blade is that increase or decrease in speed of the cylinder does not require corresponding manual adjustment of the spring tension. If the speed of the cylinder is increased, the surplus ink must be more rapidly removed and consequently the blade should apply correspondingly more pressure to the cylinder surface. The springs 14 are placed under somewhat more tension than is required for ordinary speeds while the limiting pin 19 maintains proper cooperation between the blade and the cylinder, so that the blade will not unduly press against the cylinder surface. There is thus sufficient energy stored in the springs to hold the blade firmly against the cylinder even when the press is speeded up, with the result that this speed-up may cause a slight flexure or bowing of the blade beyond its normal curvature, so that the blade will press more firmly against the cylinder and be able to effectually remove the increased amount of ink fed thereto. If the press is later slowed down, the blade will assume its normal curvature for the particular speed of press operation. The blade thus autogeneously adjusts itself to the cylinder speed and will give satisfactory results under a wide range of speeds of press operation.

Irrespective of the speed at which the press is running, the ink, sheared from the cylinder in the manner described, will follow along the under surface of the blade without sharp change in direction of flow as it leaves the cylinder to return to the fountain by gravity. Inasmuch as the blade of this invention functions with a well defined shearing operation, the ink is at no time placed under pressure beneath the blade and consequently slinging of the ink so common in the presses of prior practice is entirely avoided.

Another advantage of the present invention is that the proper optimum adjustment of the blade with the cylinder may be simply and easily accomplished. Fine adjustments, such as have heretofore been necessary, are entirely unessential and yet the present invention operates more efficiently and produces better results than prior practice and scoring of the cylinder or damage to the blade from the presence of extraneous matter in the ink is avoided.

The foregoing detailed description sets forth the invention in its preferred practical form, but the invention is to be understood as fully commensurate with the appended claims.

Having thus fully described the invention, what [I] *we* claim as new and desire to secure by Letters Patent is:

1. An assembly of the character described comprising: an intaglio printing cylinder mounted to rotate on its axis, a blade holder mounted for pivotal movement on an axis parallel to the axis of the cylinder, a thin resilient blade carried by said blade holder and bearing against the surface of the cylinder with the cylinder engaging edge of the blade facing in a direction oppositely to the direction of rotation of the cylinder and [contacting with the cylinder above] *in the direction* of the plane which includes the axes of both the cylinder and the blade holder, and means for retractably maintaining said edge of the blade in contact with the cylinder.

2. An assembly according to claim 1, wherein the means for retractably maintaining the edge of the resilient blade in contact with the cylinder comprises a spring.

3. An assembly according to claim 1, wherein the resilient blade is of bowed shape with its concave side facing the axis of the blade holder.

4. An assembly of the character described comprising: an intaglio printing cylinder mounted to rotate on [its] *a horizontal* axis, a blade holder mounted for bodily movement toward and away from the cylinder in a direction substantially normal to the surface of the cylinder, a thin resilient blade carried by the blade holder *and movable therewith in a direction transversely of the width of the blade* and bearing against the surface of the cylinder with the cylinder engaging edge of the blade *above the axis of the cylinder and* facing in a *downward* direction oppositely to the direction of rotation of the cylinder, and means for yieldably and retractably maintaining the blade holder with the edge of the blade in contact with the cylinder.

5. An assembly of the character described comprising: an intaglio printing cylinder mounted to rotate on its axis, a blade holder, a thin resilient blade carried by the blade holder and bearing against the surface of the cylinder with the cylinder engaging edge of the blade facing in a direction oppositely to the direction of rotation of the cylinder, means for mounting the blade holder for bodily movement toward and away from the cylinder in a direction transversely *of the width* of the blade, and means for yieldably and retractably forcing said blade holder in the direction of the cylinder to maintain the blade holder in engagement with the cylinder with the blade under transverse stress.

References Cited in the file of this patent or the original patent

UNITED STATES PATENTS

| | | |
|---|---|---|
| 1,252,431 | Gubelman | Jan. 8, 1918 |
| 1,631,169 | Weiss | June 7, 1927 |
| 1,837,672 | Pirie | Dec. 22, 1931 |
| 2,106,029 | Horton | Jan. 18, 1938 |

FOREIGN PATENTS

| | | |
|---|---|---|
| 282,885 | Germany | Dec. 29, 1927 |